United States Patent [19]
Lee

[11] Patent Number: 5,233,667
[45] Date of Patent: Aug. 3, 1993

[54] CAMCORDER WITH A MICROPHONE

[75] Inventor: Sang Jae Lee, Kyungki, Rep. of Korea

[73] Assignee: Goldstar Co., Ltd., Rep. of Korea

[21] Appl. No.: 812,474

[22] Filed: Dec. 23, 1991

[30] Foreign Application Priority Data

Dec. 24, 1990 [KR] Rep. of Korea .................... 90-20723

[51] Int. Cl.⁵ ............................................ H04R 25/00
[52] U.S. Cl. ...................................... 381/169; 381/26; 381/92; 358/909
[58] Field of Search ............... 381/169, 188, 205, 91, 381/92, 26; 358/909, 906, 908

[56] References Cited

U.S. PATENT DOCUMENTS

| | | | |
|---|---|---|---|
| 4,763,146 | 8/1988 | Niikura ................................. | 358/909 |
| 4,764,817 | 8/1988 | Blazek et al. ...................... | 358/909 |
| 4,817,153 | 3/1989 | Fernandez ............................ | 381/92 |
| 4,937,673 | 6/1990 | Saito et al. ......................... | 358/909 |
| 5,031,872 | 7/1991 | Vance et al. ....................... | 381/169 |

Primary Examiner—Jin F. Ng
Assistant Examiner—Huyen D. Le
Attorney, Agent, or Firm—Morgan & Finnegan

[57] ABSTRACT

Disclosed is a camcorder comprising a microphone housing formed in one side of the body of the camcorder for receiving a microphone body, a microphone body received in the microphone housing so as to move forwards and backwards, a resilient means for resiliently supporting the microphone body, and a switching means for controlling a recording device of the camcorder according to the motion of said microphone body.

10 Claims, 5 Drawing Sheets 5,233,667

CAMCORDER WITH A MICROPHONE

FIELD OF THE INVENTION

The present invention relates to a camcorder, particularly, a resilient latch 4c a camcorder with a microphone for assisting a photographer to give directions to an actor.

BACKGROUND OF THE INVENTION

In general, a camcorder is not provided with a microphone. Hence, a photographer with a camcorder gives directions to an actor in his natural voice or by means of a separate microphone. In this case, considerable difficulties are caused for the photographer to communicate his directions to the actors at distant or crowded places. In order to resolve such difficulties, U.S. patent application Ser. No. 699,187 ('187), now abandoned, discloses a camcorder for assisting the photographer to communicate directions to the actors.

U.S. patent application ('187) discloses a camcorder body 41 with a space 41a for receiving a microphone 54, as shown in FIGS. 1 and 2. The microphone may be pulled out from the space. Namely, the microphone 54 is redoubtably supported by a connecting tube 48, which in turn is supported by means of an opening 50 provided in one end portion thereof to rotatably receive a shaft 45 formed on a projecting surface of a slider 43, as shown in FIG. 3.

On the shaft 45 are sequentially mounted a circular plate spring 46 with stopping projections 47, the connecting tube 48 with a stopping cut 47, and a cover 51 connected by means of a bolt. Thus the microphone 54 may be horizontally and vertically rotated on the slider 43.

The slider 43 is slidably mounted on a guide rail 42 attached to the camcorder body 41. The projection surface 44 of the slider 43 includes a switch SW for turning the voltage source of the microphone on and off according to the closing and opening motion of the microphone 54. Thus the photographer redoubtably pulls out the microphone from the inside of the camcorder body 41 when speaking the directions to the actors. Of course, the microphone may be moved to a proper position by means of the slider 43. The switch is automatically turned on or off according to the opening and closing motion of the microphone.

However, this camcorder not only has the inconvenience of having to manually pull the microphone from the camcorder body and fix it in a given position, but the microphone is not properly mounted on small camcorder of 8 mm or VHS-C type.

SUMMARY OF THE INVENTION

Accordingly, is an object of the present invention to provide a camcorder provided with a microphone particularly suitable for a small camcorder.

It is another object of the present invention to provide a camcorder with a microphone that is easily handled.

According to the present invention, a camcorder comprises a microphone housing formed in one side of the body of the camcorder for receiving a microphone body, a microphone body received in the microphone housing so as to move forwards and backwards, a resiliently means for resiliently supporting the microphone body, and a switching means for controlling a recording device of the camcorder according to the motion of said microphone body.

The present invention will now be described more specifically with reference to the drawings only by way of example.

DESCRIPTION OF THE INVENTION

Figure 1:
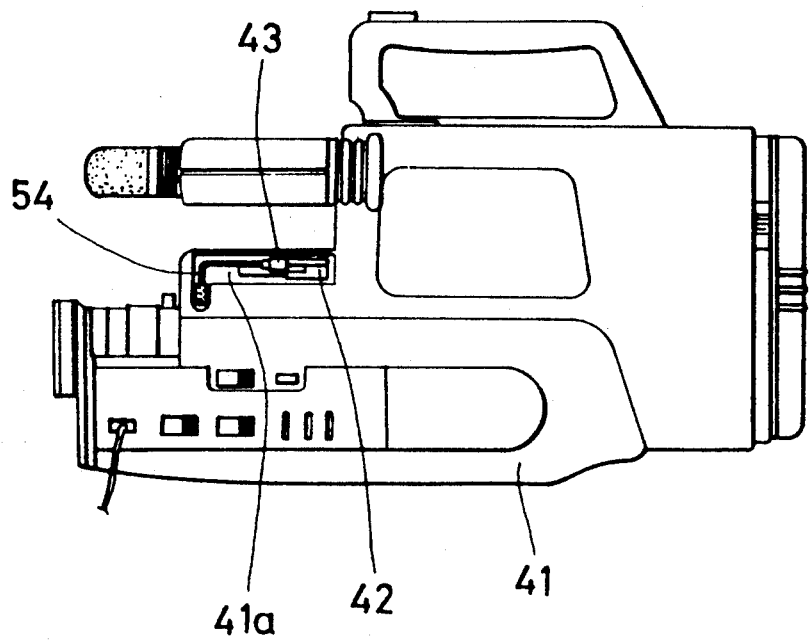
FIG. 1 is a side view of a prior art camcorder with a microphone.
Figure 2:
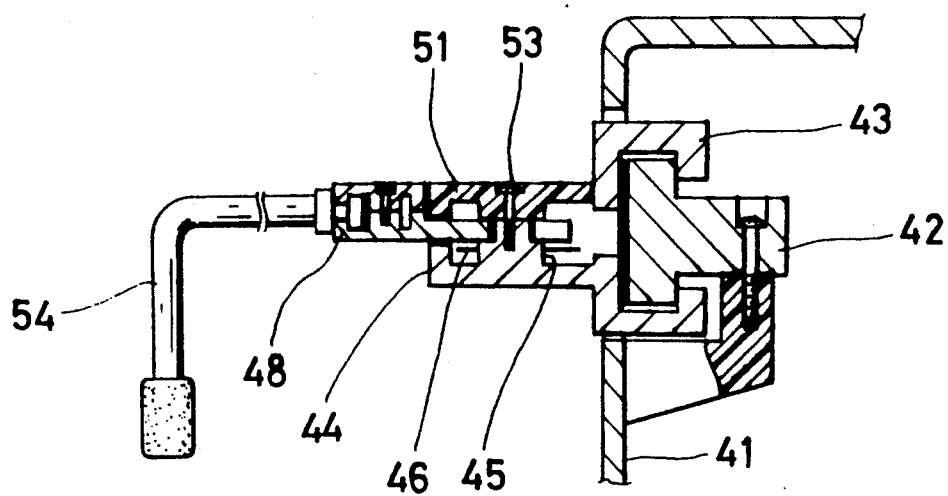
FIG. 2 is a cross sectional view of the essential part of a prior art camcorder with a microphone.
Figure 3:
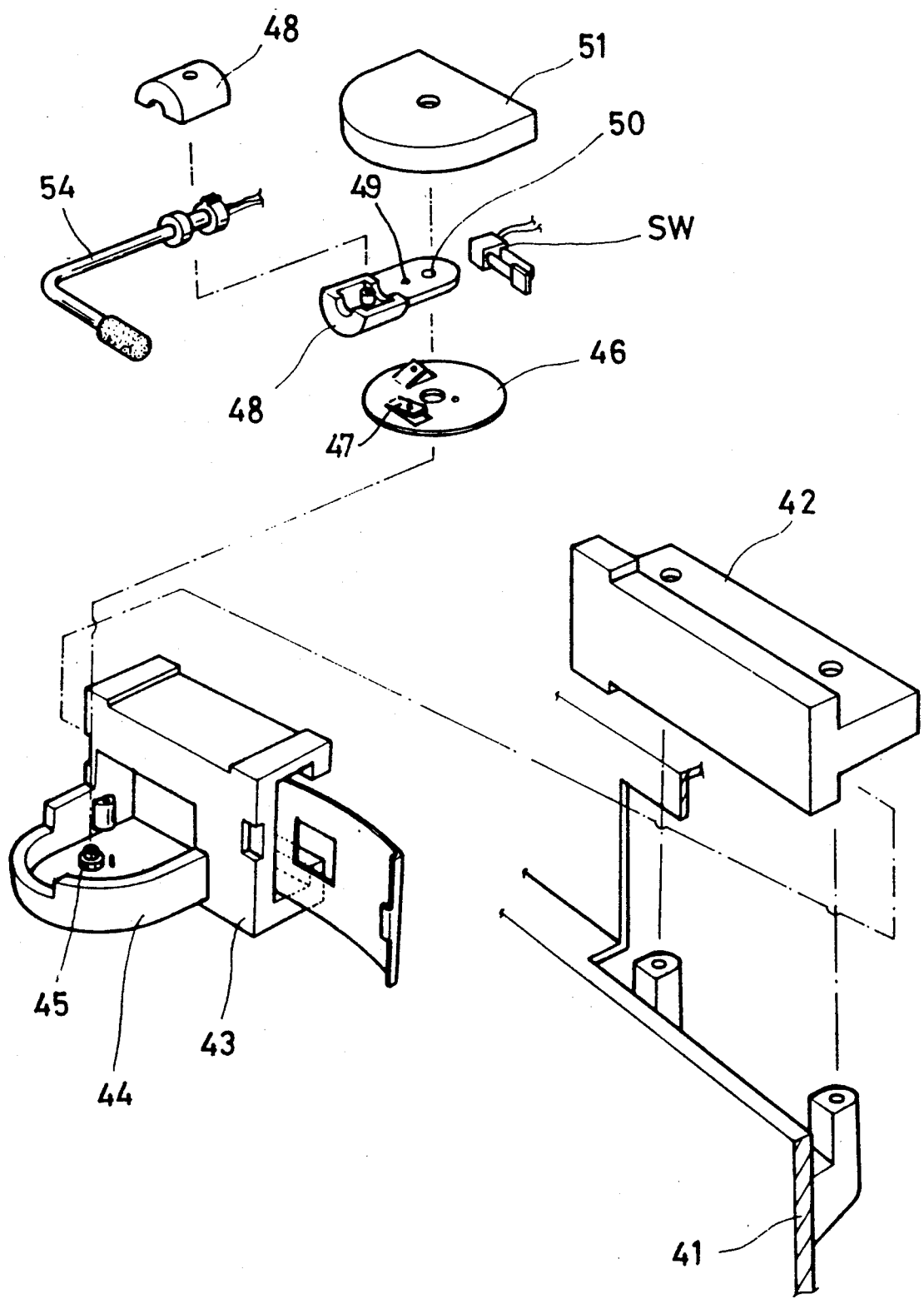
FIG. 3 is an enlarged perspective view of the microphone mounting part of a prior art camcorder with a microphone.
Figure 4:
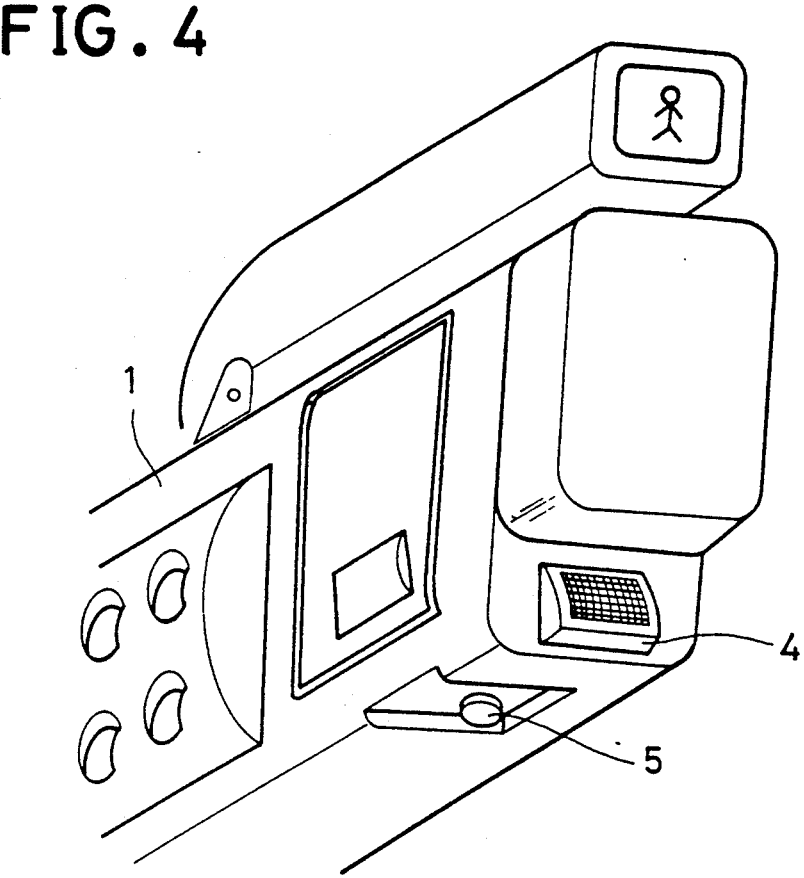
FIG. 4 is a perspective view of a part of camcorder with a microphone according to the present invention.

Referring to FIG. 4, there is mounted a microphone for assisting a photographer to communicate directions to actors on the rear side of the body 1 of a camcorder. Namely, a microphone housing for mounting the microphone is provided in the lower part of the rear side of the body 1.

Figure 5:
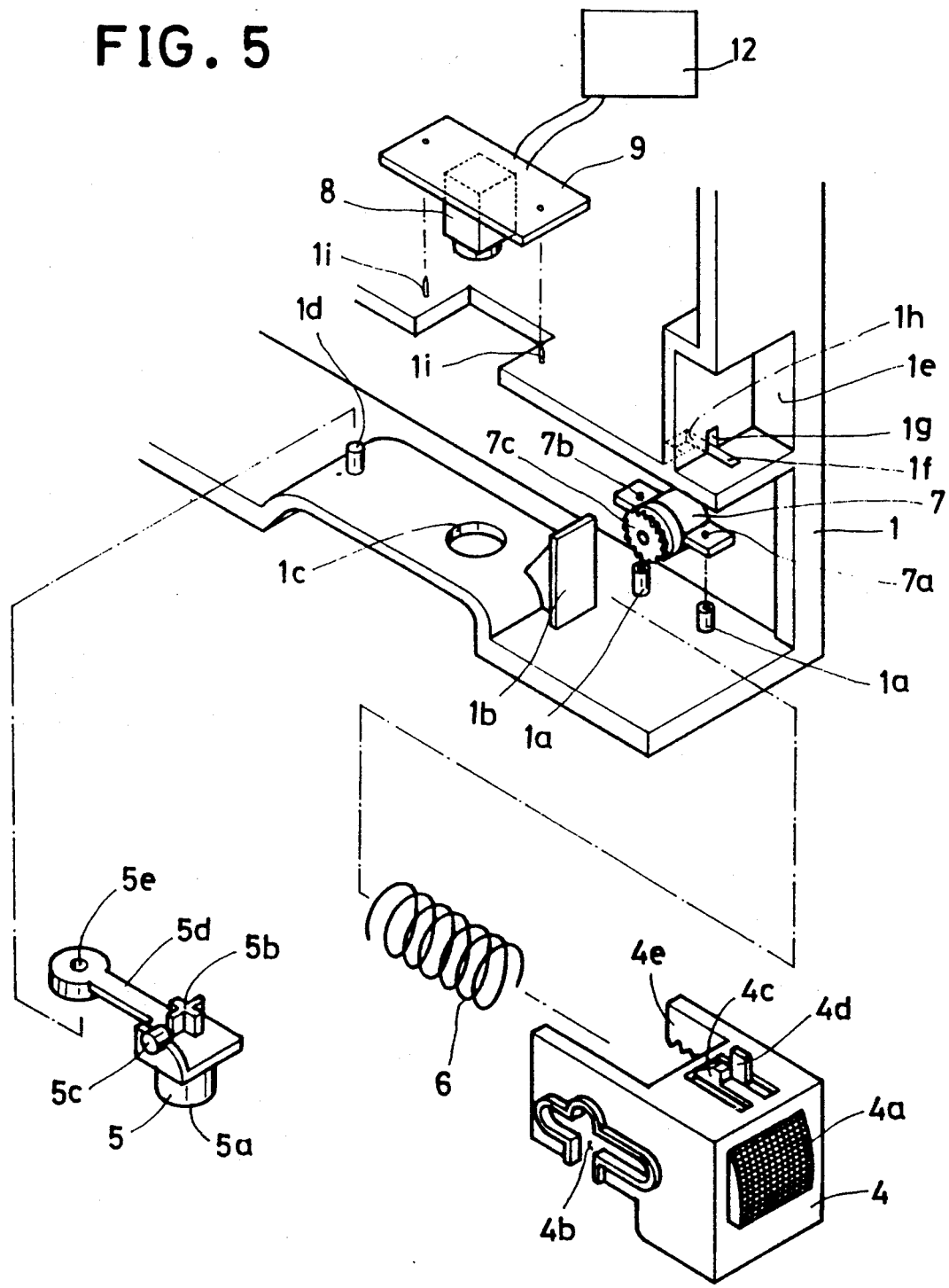
FIG. 5 is an enlarged perspective view of the microphone mounting part of a camcorder with a microphone according to the present invention.

The body 4 of the microphone comprises a front grill 4a, a shock absorbing rack 4e formed on the lower end of a side wall, a resilient latch 4c with a projection 4d formed on the upper side, as shown in FIG. 5.

The resilient latch 4c is held in a slot 1h formed in the upper side of the microphone housing, and the projection 4d is formed on one side of the resilient latch 4c. The projection 4d is pressed to release resilient latch 4c from the slot 1h, and protrudes through openings 1g and 1f formed below a battery mounting cavity 1e of the body 1 so as to be operated from the outside of the camcorder.

The microphone is resiliently supported by a spring 6 interposed between the body 4 of the microphone and a supporting plate 1b fixed on the bottom surface of the body 1 of the camcorder 1. Thus the microphone resiliently held in the stored position by the spring 6 and resilient latch 4c is automatically protruded by the resilient force of the spring to the working position by lightly pressing the projection 4d to release the resilient latch 4c from the slot 1h.

There are also provided an opening 1c for receiving a knob 5 and a projection 1d for supporting the knob 5 on the bottom surface of the body 1 of the cam corder in front of the supporting plate 1b. The knob 5 is to move the contact switch to the on/off position of the recording device 12 of the body 1 of the camcorder. The knob 5 comprises an opening 5e for receiving the knob supporting projection 1d, a resilient connecting strip 5d, upper and lower projections 5a and 5b provided on the upper and lower surface of the free end of the connecting strip 5d, and a horizontal projection 5c provided on the side of the free end.

The opening 5e of the knob 5 receives the knob supporting projection 1d formed on the bottom surface of the microphone housing. The lower projection 5a of the free end of the resilient connecting strip 5d is inserted in the opening 1c, and the horizontal projection 5c in a cross-shaped guide groove 4b formed in one side of the body 4 of the microphone. The contact switch 8 for turning on and off the recording device within the body 1 of the camcorder is positioned on the upper surface of the microphone housing so as to be contacted by the upper projection 5b of the knob.

Namely, the contact switch 8 is fixed to the fixing plate 9 that in turn is mounted on the upper surface of the microphone housing by means of pins 1i attached on the upper surface. The free ends of the pins 1i are preferably bent or melted to firmly fix the plate.

Thus if the lower projection 5a of the knob 5 is pressed, the upper projection 5b pushes the contact switch 8 to turn off the recording device. Then the microphone may be properly used. Moreover, a shock absorbing means is provided in order to absorb the shocks caused when the microphone body is resiliently pushed out by releasing the resilient latch 4c from the slot 1h. The shock absorbing means consists of a damping gear 7 with a toothed wheel 7c cooperating with a rack 4e formed on the lower end of a side wall of the body 4 of the microphone. Supporting strips 7a and 7b are symmetrically attached on the side of the damping gear 7 to fixedly mount it on microphone housing by means of bolts engaged with fixed projections 1a attached to the bottom surface of the microphone housing. Thus the rack 4e of the microphone body 4 cooperates with the toothed wheel 7c to slowly move the microphone body 4, thereby absorbing the undesirable shocks.

Figure 6:
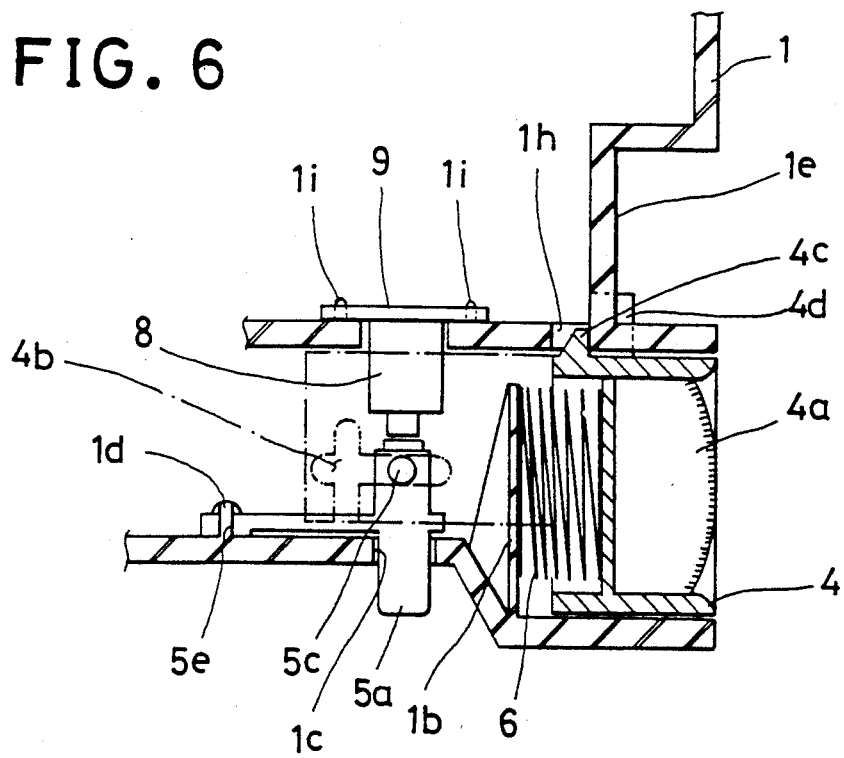
FIG. 6 is a cross sectional view illustrating the microphone in the stored position in the inventive camcorder.

When the microphone is not in use, the body 4 of the microphone is resiliently supported by the spring, and firmly held by the resilient latch 4c engaged with the slot 1h, as shown in FIG. 6. Meanwhile, the horizontal projection 5c of the knob 5 is positioned in the horizontal groove portion of the cross-shaped groove 4 formed on a side of the body 4 of the microphone, thus preventing the lower projection 5a of the knob from pressing.

Figure 7A:
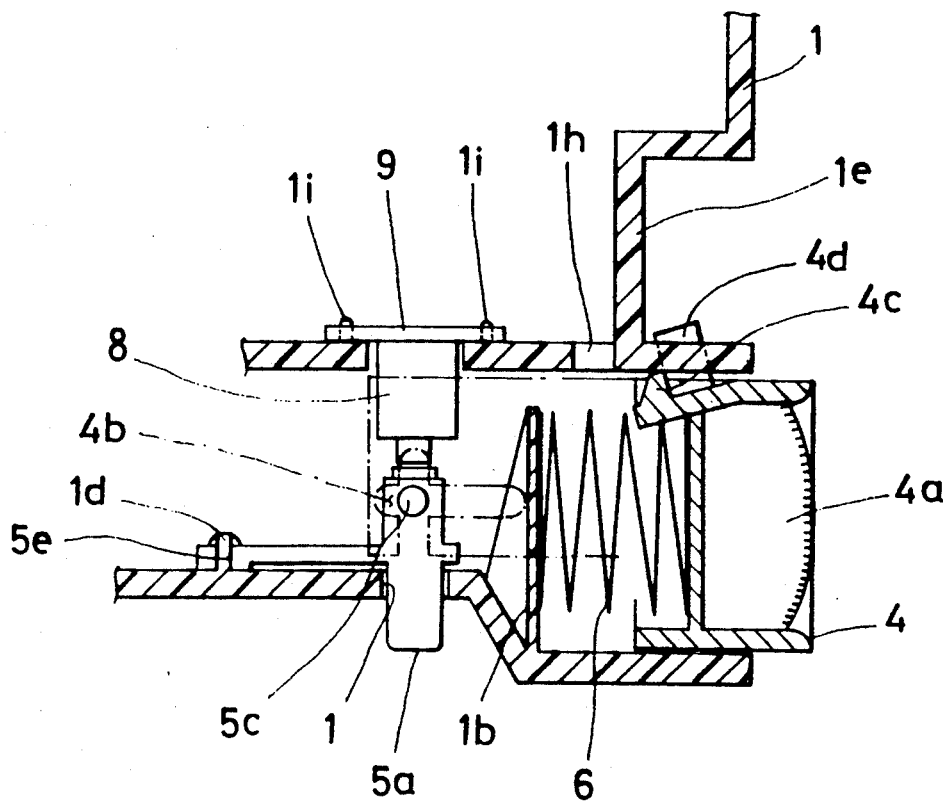
FIG. 7A is a cross sectional view illustrating the microphone in the working position in the inventive camcorder.
Figure 7B:
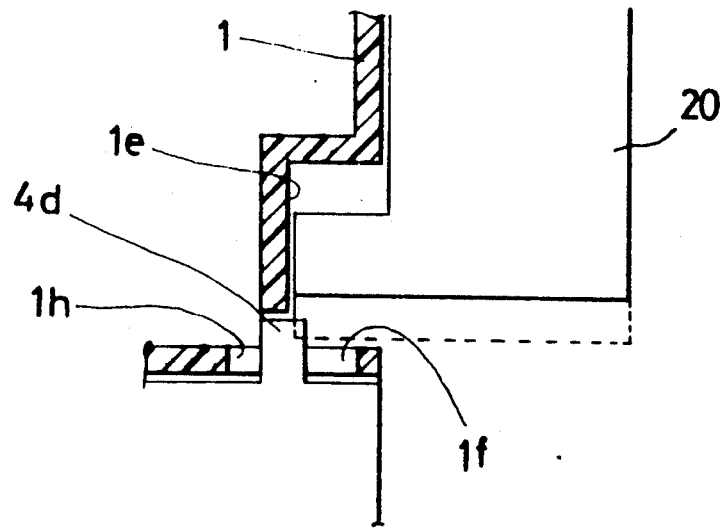
FIG. 7B is a cross sectional view illustrating the microphone mounted in the inventive camcorder.

In order to use the microphone, if the projection 4d of the microphone body 4 is pressed so as to release the resilient latch 4c from the slot 1h as shown in FIG. 7A, then the microphone body 4 is pushed out towards the user by the resilient force of the spring 6. In addition, this causes the horizontal projection 4d 5c of the knob 5 to be positioned in the vertical groove portion of the cross-shaped groove 4b, so that the lower projection 4d 5a may be pressed to operate the contact switch 8 to turn off the recording device of the camcorder. Thus the photographer may use the microphone in order to communicate the directions to actors.

The projection 4d may be arranged in any places on the outside of the camcorder body 1 to easily operate.

As stated above, the camcorder with a microphone according to the present invention facilitates the photographer to readily use the microphone to communicate directions to actors at remote or crowded places without unwanted recording.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:
1. A camcorder comprising:
   a recessed microphone chamber in a rear wall of said camcorder for receiving and permitting translational movement of a microphone body within the recessed chamber;
   a microphone body received in said recessed microphone chamber and capable of being moved forward and backward within said recessed microphone chamber;
   a resilient means for resiliently supporting said microphone body; and
   a contact switch on one side of said recessed microphone chamber for controlling a recording device of said camcorder according to the motion of said microphone body.

2. A camcorder as claimed in claim 1, further comprising a shock absorbing means provided in one side of said recessed microphone chamber for absorbing the shocks caused by the motion of said microphone body.

3. A camcorder as claimed n claim 2, wherein said shock absorbing means consists of a damping gear means comprising:
   a rack provided in one side of said microphone body; and
   a gear wheel fixed to said recessed microphone chamber for cooperating with said rack.

4. A camcorder as claimed in claim 1, wherein said microphone body has a resilient latch provided in one side thereof and a projection formed on one side of said resilient latch, and said recessed microphone chamber has a slot for receiving said resilient latch and projection on one side thereof.

5. A camcorder as claimed in claim 4, wherein said slot for receiving said resilient latch and projection comprises:
   an opening for receiving said resilient latch; and
   another opening for receiving and guiding said projection.

6. A camcorder as claimed in claim 1, wherein said resilient means comprises a supporting plate attached to one side of said recessed microphone chamber and a spring supported by said supporting plate to support said microphone body.

7. A camcorder comprising:
   a recessed microphone chamber formed in one side of a body of a camcorder for receiving and permitting translational movement of a microphone body;
   a microphone body received in said recessed microphone chamber and movable therein;
   a resilient means for resiliently supporting said microphone body; and
   a switching means for controlling a recording device of said camcorder according to the motion of said microphone body, said switching means including a contact switch on one side of said recessed microphone chamber, a guide slot provided in one side of said microphone body, and a knob with a horizontal projection guided by said guide slot for controlling said contact switch.

8. A camcorder as claimed in claim 7, wherein said guide slot is in the form of a cross.

9. A camcorder as claimed in claim 7, wherein said knob has one end portion fixed to said recessed microphone chamber, and another end portion provided with a projection means for operating said contact switch, said another end portion being moveable upwards and backwards.

10. A camcorder as claimed in claim 9, wherein said projection means comprises a first projection to contact said contact switch and a second projection received in an opening formed in said recessed microphone chamber for moving said knob upwards and backwards.

* * * * *